United States Patent
Capio

(10) Patent No.: US 8,290,604 B2
(45) Date of Patent: Oct. 16, 2012

(54) AUDIENCE-CONDITION BASED MEDIA SELECTION

(75) Inventor: Oliver R. Capio, Foster City, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 998 days.

(21) Appl. No.: 12/291,199

(22) Filed: Nov. 7, 2008

(65) Prior Publication Data

US 2010/0048300 A1    Feb. 25, 2010

Related U.S. Application Data

(63) Continuation-in-part of application No. 12/229,134, filed on Aug. 19, 2008.

(51) Int. Cl.
*G06F 17/00* (2006.01)
(52) U.S. Cl. ........................................................ 700/94
(58) Field of Classification Search .................... 700/94; 704/500–504; 705/26.1, 14.49, 14.73; 463/1, 463/35
See application file for complete search history.

(56) References Cited

U.S. PATENT DOCUMENTS

| | | | |
|---|---|---|---|
| 3,409,877 A | 11/1968 | Alterman et al. | |
| 3,436,734 A | 4/1969 | Pomerene et al. | |
| 3,517,171 A | 6/1970 | Avizienis | |
| 3,623,014 A | 11/1971 | Doelz et al. | |
| 3,668,644 A | 6/1972 | Looschen | |
| 4,485,457 A | 11/1984 | Balaska et al. | |
| 4,587,640 A | 5/1986 | Saitoh | |
| 4,752,068 A | 6/1988 | Endo | |
| 4,858,930 A | 8/1989 | Sato | |
| 5,014,982 A | 5/1991 | Okada et al. | |
| 5,128,863 A | 7/1992 | Nakamura et al. | |
| 5,222,134 A | 6/1993 | Waite et al. | |
| 5,233,423 A | 8/1993 | Jernigan et al. | |
| 5,273,294 A | 12/1993 | Amanai | |
| 5,477,492 A | 12/1995 | Ohsaki et al. | |
| 5,490,216 A | 2/1996 | Richardson, III | |
| 5,523,551 A | 6/1996 | Scott | |
| 5,532,735 A | 7/1996 | Blahut et al. | |
| 5,636,277 A | 6/1997 | Nagahama | |
| 5,729,214 A | 3/1998 | Moore | |
| 5,794,217 A | 8/1998 | Allen | |
| 5,809,145 A | 9/1998 | Slik et al. | |

(Continued)

FOREIGN PATENT DOCUMENTS

EP    0454340    10/1991

(Continued)

OTHER PUBLICATIONS

Mueller et al., "A Nested Transaction Mechanism for LOCUS," Proceedings of the Ninth ACM Symposium on Operating System Principles (1983).

*Primary Examiner* — Andrew C Flanders
(74) *Attorney, Agent, or Firm* — Carr & Ferrell LLP

(57) ABSTRACT

Methods and systems for audience-based media selection are provided. A media player may play a first media file, which may be viewed by one or more audience members. The audience around the media player may be monitored, and audience members having a line-of-sight to the media player are identified. Information concerning various conditions of such audience members determined. Media file play may be adjusted based on the detected audience condition.

32 Claims, 3 Drawing Sheets

U.S. PATENT DOCUMENTS

| | | | |
|---|---|---|---|
| 5,829,047 A | 10/1998 | Jacks et al. | |
| 5,838,314 A | 11/1998 | Neel et al. | |
| 5,892,900 A | 4/1999 | Ginter et al. | |
| 5,913,040 A | 6/1999 | Rakavy et al. | |
| 5,971,856 A | 10/1999 | Aoyama et al. | |
| 6,066,182 A | 5/2000 | Wilde et al. | |
| 6,070,141 A | 5/2000 | Houvener et al. | |
| 6,073,123 A | 6/2000 | Staley | |
| 6,081,785 A | 6/2000 | Oshima et al. | |
| 6,085,262 A | 7/2000 | Sawada | |
| 6,117,011 A | 9/2000 | Lvov | |
| 6,119,108 A | 9/2000 | Holmes et al. | |
| 6,135,646 A | 10/2000 | Kahn et al. | |
| 6,137,480 A | 10/2000 | Shintani | |
| 6,148,335 A | 11/2000 | Haggard et al. | |
| 6,189,146 B1 | 2/2001 | Misra et al. | |
| 6,195,432 B1 | 2/2001 | Takahashi et al. | |
| 6,201,771 B1 | 3/2001 | Otsuka et al. | |
| 6,243,796 B1 | 6/2001 | Otsuka | |
| 6,247,131 B1 | 6/2001 | Kotani et al. | |
| 6,260,141 B1 | 7/2001 | Park | |
| 6,311,209 B1 | 10/2001 | Olson et al. | |
| 6,314,451 B1 | 11/2001 | Landsman et al. | |
| 6,405,203 B1 | 6/2002 | Collart | |
| 6,434,535 B1 | 8/2002 | Kupka et al. | |
| 6,446,260 B1 | 9/2002 | Wilde et al. | |
| 6,463,078 B1 | 10/2002 | Engstrom et al. | |
| 6,470,085 B1 | 10/2002 | Uranaka et al. | |
| 6,529,453 B1 | 3/2003 | Otsuka et al. | |
| 6,560,640 B2 | 5/2003 | Smethers | |
| 6,594,740 B1 | 7/2003 | Fukuda | |
| 6,611,607 B1 | 8/2003 | Davis et al. | |
| 6,640,306 B1 | 10/2003 | Tone et al. | |
| 6,694,025 B1 | 2/2004 | Epstein et al. | |
| 6,811,490 B2 | 11/2004 | Rubin | |
| 6,832,318 B1 | 12/2004 | Yaegashi et al. | |
| 6,920,565 B2 | 7/2005 | Isaacson et al. | |
| 7,043,433 B2 * | 5/2006 | Hejna, Jr. | 704/270 |
| 7,071,914 B1 | 7/2006 | Marks | |
| 7,263,462 B2 | 8/2007 | Funge et al. | |
| 7,296,007 B1 | 11/2007 | Funge et al. | |
| 7,313,251 B2 | 12/2007 | Rhoads | |
| 7,363,384 B2 | 4/2008 | Chatani et al. | |
| 7,425,903 B2 | 9/2008 | Boss et al. | |
| 7,426,750 B2 | 9/2008 | Cooper et al. | |
| 7,440,431 B2 | 10/2008 | Sindhushayana et al. | |
| 7,466,241 B2 | 12/2008 | Lyle et al. | |
| 7,495,631 B2 | 2/2009 | Bhakta et al. | |
| 7,558,698 B2 | 7/2009 | Funge et al. | |
| 7,636,645 B1 | 12/2009 | Yen et al. | |
| 7,636,697 B1 | 12/2009 | Dobson et al. | |
| 7,636,701 B2 | 12/2009 | Funge et al. | |
| 2001/0020295 A1 | 9/2001 | Satoh | |
| 2001/0025256 A1 | 9/2001 | Oliphant et al. | |
| 2001/0034721 A1 | 10/2001 | Boudreau et al. | |
| 2001/0042021 A1 | 11/2001 | Matsuo et al. | |
| 2001/0051996 A1 | 12/2001 | Cooper et al. | |
| 2002/0016922 A1 | 2/2002 | Richards et al. | |
| 2002/0052816 A1 | 5/2002 | Clenaghan et al. | |
| 2002/0077988 A1 | 6/2002 | Sasaki et al. | |
| 2002/0082997 A1 | 6/2002 | Kobata et al. | |
| 2002/0103855 A1 | 8/2002 | Chatani | |
| 2002/0104019 A1 | 8/2002 | Chatani et al. | |
| 2002/0116206 A1 | 8/2002 | Chatani | |
| 2002/0116283 A1 | 8/2002 | Chatani | |
| 2002/0129094 A1 | 9/2002 | Reisman | |
| 2002/0142845 A1 | 10/2002 | Randall Whitten et al. | |
| 2002/0161709 A1 | 10/2002 | Floyd et al. | |
| 2003/0032486 A1 | 2/2003 | Elliott | |
| 2006/0264259 A1 | 11/2006 | Zalewski et al. | |
| 2007/0015558 A1 | 1/2007 | Zalewski et al. | |
| 2007/0015559 A1 | 1/2007 | Zalewski et al. | |
| 2007/0021208 A1 | 1/2007 | Mao et al. | |
| 2007/0168359 A1 | 7/2007 | Jacob et al. | |
| 2007/0243930 A1 | 10/2007 | Zalewski et al. | |
| 2007/0244751 A1 | 10/2007 | Zalewski et al. | |
| 2007/0255630 A1 | 11/2007 | Zalewski et al. | |
| 2007/0261077 A1 | 11/2007 | Zalewski et al. | |
| 2008/0024722 A1 | 1/2008 | Pollard | |
| 2008/0091512 A1 * | 4/2008 | Marci et al. | 705/10 |
| 2008/0098448 A1 | 4/2008 | Mondesir et al. | |
| 2008/0253740 A1 | 10/2008 | Rhoads | |
| 2009/0221368 A1 | 9/2009 | Yen et al. | |
| 2009/0221374 A1 | 9/2009 | Yen et al. | |
| 2009/0288064 A1 | 11/2009 | Yen et al. | |
| 2010/0004896 A1 | 1/2010 | Yen et al. | |

FOREIGN PATENT DOCUMENTS

| | | |
|---|---|---|
| EP | 0773490 | 5/1997 |
| EP | 0795809 | 9/1997 |
| EP | 1016960 | 7/2000 |
| JP | 04253885 | 9/1992 |
| JP | 06180674 | 6/1994 |
| JP | 9244886 | 9/1997 |
| JP | 10069511 | 3/1998 |
| JP | 10133955 | 5/1998 |
| JP | 10222428 | 8/1998 |
| JP | 11143719 | 5/1999 |
| JP | 2000020795 | 1/2000 |
| JP | 2000227919 | 8/2000 |
| JP | 2000298689 | 10/2000 |
| JP | 2001169246 | 6/2001 |
| KR | 1998030143 | 7/1998 |
| KR | 1998033266 | 7/1998 |
| KR | 2000060715 | 10/2000 |
| WO | 00/63860 | 10/2000 |
| WO | 02/01333 | 1/2002 |

* cited by examiner

AUDIENCE-CONDITION BASED MEDIA SELECTION

CROSS-REFERENCE TO RELATED APPLICATION

The present application is a continuation-in-part and claims the priority benefit of U.S. patent application Ser. No. 12/229,134 filed Aug. 19, 2008, the disclosure of which is incorporated herein by reference.

BACKGROUND OF THE INVENTION

1. Field of the Invention

The present invention generally relates to media selection. More specifically, the present invention relates to media selection based on audience conditions.

2. Description of Related Art

There are many types of media files. Media files may include static files (e.g., text and stationary graphics), dynamic files (e.g., video and/or audio), and combinations of the foregoing. These media files may be available in various formats and presented on any variety of media players.

A media player may present media files based on any variety of lists and/or based on direct user selection. For example, a playlist may be provided to the media player, which causes each media file to be played in the order provided in the playlist. The playlist may be generated and based, at least in part, on one or more user selections, on a randomizing algorithm (e.g., shuffle), or a combination of the foregoing such as the random playback of a user's top ten selections. Alternatively, the media player may receive user selections one at a time.

Various types of media players may be used to expose one or more media files to an audience. For example, presently available billboards are capable of displaying various multimedia advertising to passing pedestrian traffic. Such advertising may include a series of different types of media files. Such media files may be played and/or displayed in a timed series. In such an example, a graphical presentation may be displayed for one minute, followed by a video played for another minute, followed by a second video played for one minute, and so forth. Each media file may be played in a predetermined series or may be played at random.

Such prior art methods of media selection are not responsive to changing audience composition or conditions, which may include the gender or age of audience members or whether a particular member is paying attention to the displayed media. Unresponsiveness to changing audience composition or conditions may mean that various media files are not being displayed to their best advantage, which may affect the overall effectiveness of advertising (e.g., feminine products being advertised to a predominantly male audience). There is, therefore, a need for improved methods for audience-condition driven media selection.

SUMMARY OF THE INVENTION

The present invention provides for methods and systems for audience-condition based media selection. A media file may be displayed on a media player. A sensor identifies an audience member having a line-of-sight to the media player. A condition of the audience member may be detected. Detected conditions may encompass age or gender, for example. The media file play may be adjusted based on the detected condition.

Various embodiments of the present invention include methods for audience-condition based media selection. Such methods may include playing a media file on a media player, identifying an audience member having a line-of-sight with the media player from an audience proximate to the media player, detecting a condition associated with the identified audience member, and adjusting the media file play based on the condition of the identified audience member.

Further embodiments may include counting the audience and detecting various audience conditions. In some embodiments, facial recognition may be used to determine the audience condition, which may include age, gender, and the like. Further, information concerning the detected conditions may be stored in association with the media file. Audio responses and the location on the media player to which lines-of-sight are directed may also result in adjustment to the media file. In some embodiments of the present invention, the media file and audience may be in a virtual environment.

Still further embodiments of the present invention include systems for audience-condition based media selection. Such systems may include a memory configured to store a plurality of media files for playing on a media player, a sensor configured to monitor an audience and to identify lines-of-sight, and a processor configured to determine a condition of the audience member having a line-of-sight, generate instructions for adjustment of the media file, and to provide the instructions to the media player. Some embodiments of the present invention include computer-readable storage media having embodied thereon programs that, when executed by a processor or computing device, perform methods for audience-condition based media selection.

DETAILED DESCRIPTION

The present invention provides for methods and systems for audience-condition driven media selection. A media player may present a first media file, which may be viewed by one or more audience members. The audience around the media player may be monitored, and various audience conditions including age, gender, gestures, and lines-of-sight of audience members may be detected. Media playback may be adjusted based on a certain detected audience condition. In some embodiments of the present invention, the audience may be in a virtual environment.

Figure 1A:
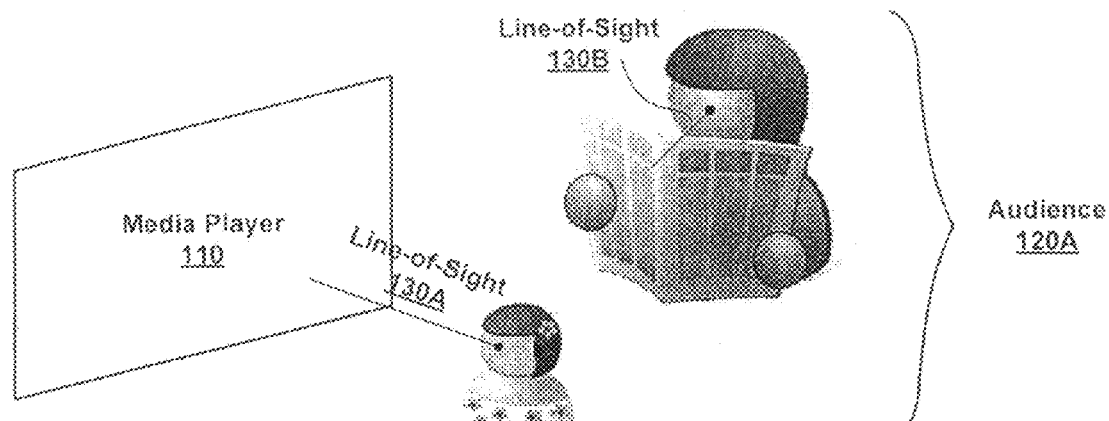
FIGS. 1A and 1B illustrate a media player before two different audiences, each audience having different lines-of-sight.

FIG. 1A illustrates a media player 110 before an exemplary audience 120A. The audience 120A illustrated in FIG. 1A includes two audience members proximate to the media player. Only one audience member, however, has a direct line-of-sight 130A with the media player 110. This particular audience member may be identified as female and under the age of 13 through various techniques discussed in further detail herein. The other audience member has a line-of-sight 130B that is directed to her newspaper likely indicating that this particular audience member is not paying attention to the media player 110 if not wholly unaware of the same.

Figure 1B:
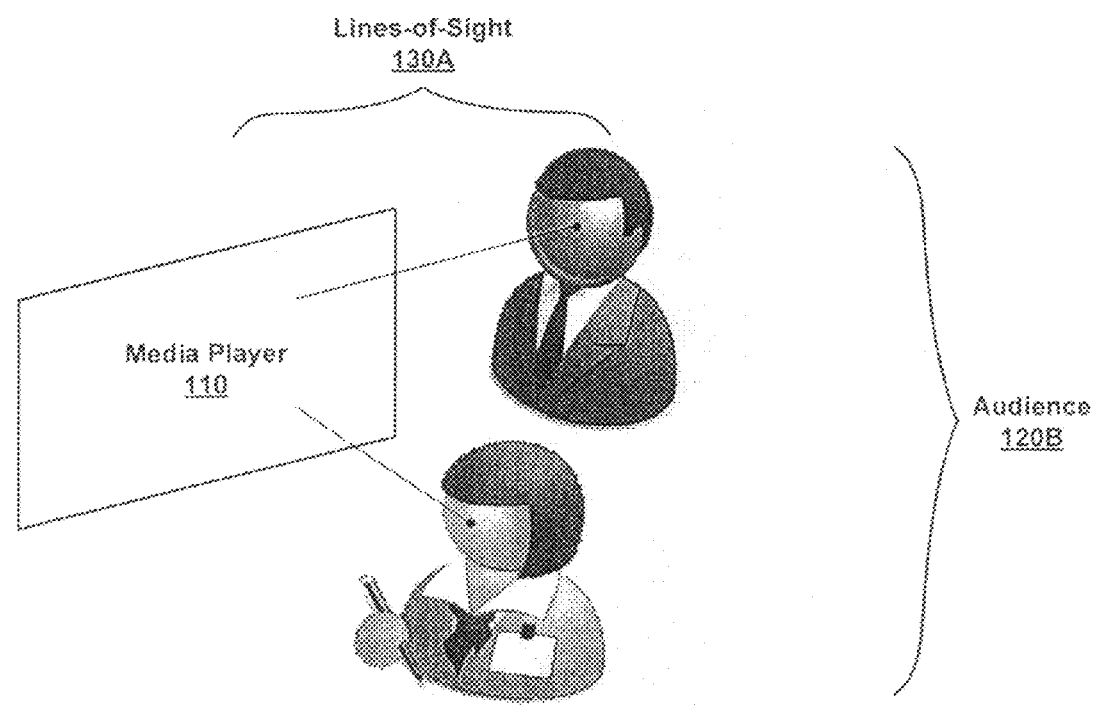

FIG. 1B illustrates the same media player 110 before another exemplary audience 120B. The audience 120B of FIG. 1B includes two audience members with lines-of-sight 130A with the media player. One audience member may be identified as being female and being between the ages of 25-50. The other audience member may be identified (again, using techniques discussed herein) as male and also being between the ages of 25-50.

Figure 2:
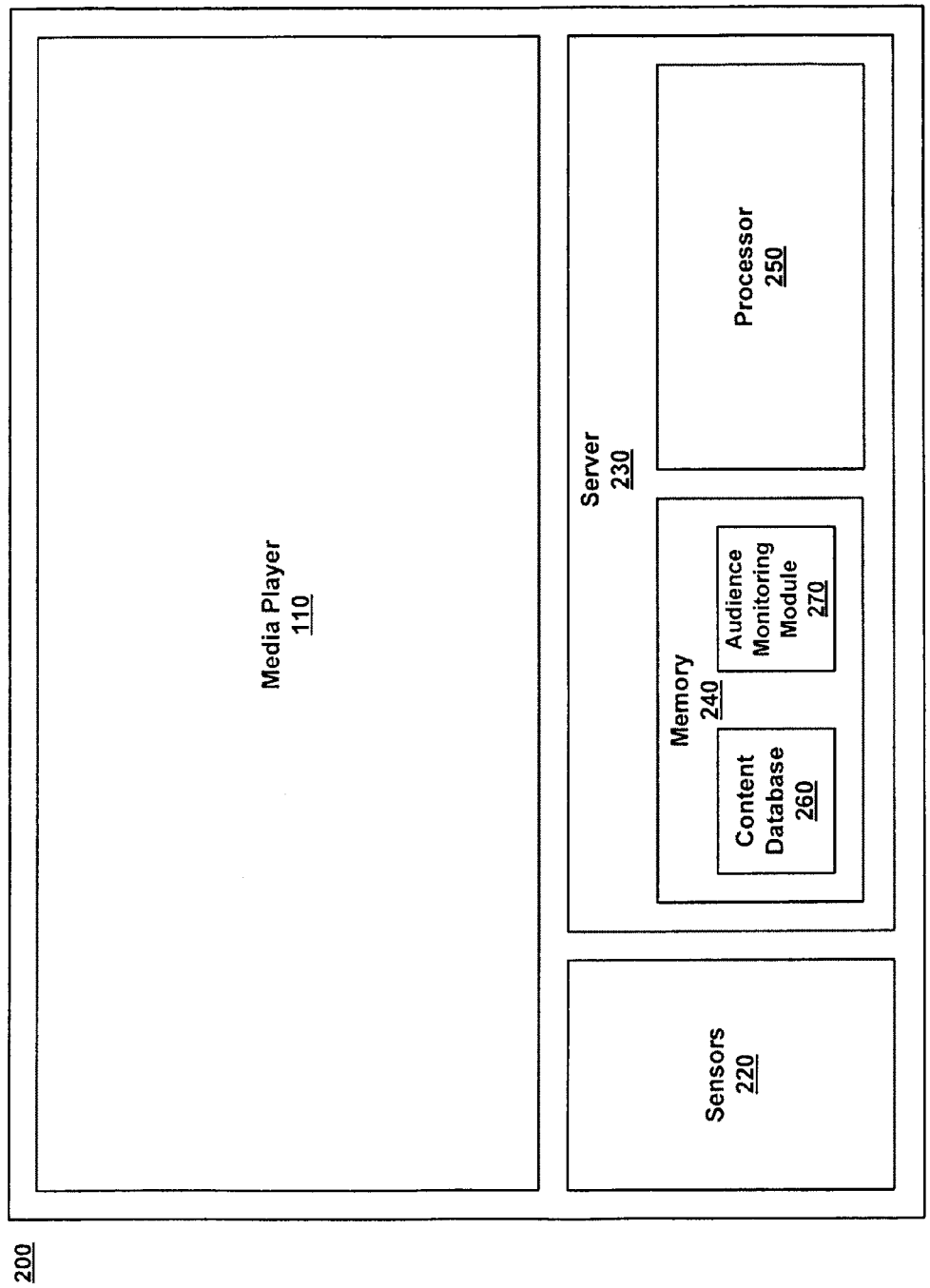
FIG. 2 is an exemplary system for audience-condition based media selection.

FIG. 2 is an exemplary system 200 for audience-condition based media selection. The system 200 may include a media player 110, one or more sensors 220 (for example, an array of one or more different types of sensors), and a media server 230. The server 230 may include memory 240 and processor 250. The server may, in some embodiments, be a part of the system 200 or remote from, for example, the media player 110 and coupled via a communications network. Sensors 220, too, may likewise be an integrated part of the system 200 or physically remote from the media player 110 and/or server 230 but in operative communication and cooperation with the same.

Members of the audience having a line-of-sight with the media player and/or exhibiting some other condition may be identified by sensors 220. Information concerning line-of-sight and various audience conditions may be provided to server 230 for analysis by audience monitoring module 270. Media files may be selected from a content database 260 maintained in memory 240 by processor 250. Components of server 230, like the media selection system 200 in general, may be integrated or distributed. For example, content database 260 may be located remote from the audience monitoring module 270 and processor 250. Content in the database 260 may be in a dedicated storage facility or memory component accessible by the server 230.

Selection and presentation of media files may be based on the information concerning the line-of-sight/condition(s) of the audience provided by sensors 220 and analyzed through the execution of the audience monitoring module 270 by the processor 250. Following selection of media files from the content database 260, the content may be provided to media player 110 for presentation.

Media player 110 may include any number of programs, applications, hardware, software, and various combinations of the foregoing that are well-known in the art for playing one or more media files. Media files may be provided to media player 110 (via content database 260 where the actual files are stored) in accordance with a playlist, which may be designed by various users, administrators, or artificial intelligence including certain determinations made responsive to the execution of audience monitoring module 270. Media files may include text files, graphics files, video files, audio files, and various combinations thereof. Playback or display of a media file may include presenting a display (in the instances of still-frame or single-frame content), video, and/or audio content.

Sensor 220 may include any of a variety of sensors with the ability to detect a variety of conditional and/or environmental information, including motion, lines-of-sight, and various conditions of members of a crowd such as age, gender, race, physical condition, and physical expression. The number and types of sensors 220 included in the system 200 may vary depending on requirements or conditions of the area, the location and orientation of the media player, and user requirements or desires. For example, a user may wish to monitor certain audience members within a certain area around the media player 110. Depending on the capabilities of each sensor, monitoring a certain area may require multiple sensors 220 at different locations around media player 110. In some embodiments, sensors 220 may detect and capture video, audio, or a combination of the foregoing types of information concerning the audience proximate the media player.

Sensors 220 may be embedded immediately proximate the media player 110. In FIG. 2, for example, sensors 220 are embedded directly adjacent the display screen as a part of a display housing. Sensors 220 may likewise be separately housed separately (e.g., remote sensors). Sensor 220 may be communicatively coupled to the system 200 and provide information to various other components of system 200. For example, upon sensing a conditional or environmental information (e.g., presence and conditions of an audience member), the sensors 220 can provide information concerning such conditions to server 230 for processing and analysis by execution of the audience monitoring module 270.

Server 230 is configured to select and provide content (e.g., media files) to the media player 110. Like sensor 220, server 230 may be integrated with media player 110 or housed separately. In the instance of server 230 being separately housing, the various components of server 230 may be communicatively coupled to and provide information to various other components of system 200.

As illustrated in FIG. 2, server 230 includes a memory 240 and a processor 250. Memory 240 may store any combination of databases and software modules in addition to being generally configured for the storage of information (e.g., information detected and captured by sensors 220 and/or subsequently processed through the execution of audience monitoring module 270). Memory 240 may reside on server 230 and be configured to store any of the variety of media files that may be played on media player 110. Such files may be stored in content database 260.

Content database 260 may be configured to allow for the indexing of content such that particular types of content may be easily and quickly identified and retrieved by processor 250 for subsequent display via media player 110. This indexing may utilize metadata. Metadata may identify the nature of the content (e.g., ideal for a female audience, ideal for a male audience, ideal for an audience between the ages of 25-40). Metadata or some other indicia such as a file extension may identify the nature of the content including audio, video, static images, or any combination of the foregoing. Retrieval of content from content database 260 by processor 250 may occur in response to a particular piece of content having been identified on a playlist or through some other intelligent determination that may occur in response to the execution of the audience monitoring module 270.

Content may also be retrieved from the content database 260 in response to the need for content having a particular characteristic, which may be identified via metadata or storage in a particular hierarchy of the memory (e.g., a file storage structure with video-only files or static text-only files). Content generated and/or supplied by certain providers or that may be appropriate for certain contexts may also be indexed and retrieved as is appropriate based on any number of factors including traffic density and flow (e.g., video for a slow moving audience, static files for a fast moving audience, or audio-inclusive files for environment with a low ambient noise level).

Audience monitoring module 270 is a software module that may be executed by processor 250 in response to data provided by sensor(s) 220. Audience monitoring module 270 may utilize data provided by sensors to characterize a particular audience member, based on a variety of conditions including gender, age, direction of line-of-sight, and audio response. Utilizing this information, the audience monitoring module 270 may then determine what type of content may be appropriate for display for that particular audience member.

Audience monitoring module 270 (in conjunction with sensors 220) may use various facial recognition strategies to characterize various conditions of a particular audience member. For example, the audience monitoring module 270 may receive data from sensors 220 concerning a particular audience member (e.g., audience member with a direct-line-of-sight 130A in audience 120A), use facial recognition to analyze such data, and determine that the line-of-sight of the audience member is indeed directed at the media player 110, the audience member is likely female, and in an age group comprising individuals younger than 13 years old. The age groupings may be determined based on facial recognition techniques, a user, a system administrator, or a combination of the foregoing.

Further, audience monitoring module 270 may determine from sensor data a duration that the audience member looks at the media player 110. Audience monitoring module 270 may also determine that a plurality of audience members have lines-of-sight to media player 110 and count the plurality of audience members. This information may be useful for determining the popularity of the content as low-interest content is unlikely to generate long-term viewing of the media player 110 and or direct attention to the same.

Audience monitoring module 270 may also determine facial expressions (e.g., a smile or a frown) and provide for adjustment of the content accordingly. In this regard, detection of a smile might be indicative of pleasing or desired content whereas a frown may indicate that a user is uninterested or 'turned off' by the content being displayed. Similarly, audience monitoring module 270 may also be able to receive audio responses information from sensors 220. The system 200 may then determine the tone or content of the audio response (e.g., using voice recognition) to adjust the content (e.g., 'wow—this movie looks good' or 'did you see that?!' versus 'this movie is awful'). Audience monitoring module 270 may also be able to determine from sensor data that the audience member is focused on a certain portion of the media player 110. For example, execution of the audience monitoring module 270 in response to received data from sensors 220 may determine what is being displayed at the particular location being looked at (i.e., toys, animals, or particular people). Audience monitoring module 270 may then store any such information concerning the audience member in association with the media file being played.

A number of gesture, tracking, and monitoring techniques are disclosed in the following U.S. patent publications, the disclosure of which are incorporated herein by reference: U.S. patent publication number US-2008-0098448-A1; U.S. patent publication number US-2007-0168359-A1; U.S patent publication number US-2007-0015559-A1; U.S. patent publication number US-2007-0015558-A1; U.S. patent publication number US-2008-0024722-A1; U.S. patent publication number US-2007-0021208-A1; U.S. patent publication number US-2006-0264259-A1; and U.S. Pat. No. 7,701,914 B1.

Based on information concerning the one or more audience members as provided by audience monitoring module 270, processor 250 may determine certain content may be best appropriate for the audience member. Such content may include still-frame images or textual content that is gender-specific and/or age-appropriate to the audience member. Gender specificity and age-appropriateness of a media file may be determined based on various ratings, categories, and metadata associated with each media files. Various methodologies for selecting content are disclosed in the following U.S. patent publications, the disclosure of which are incorporated herein by reference: U.S. Pat. No. 7,363,384 B2; U.S. patent publication number US-2007-0243930-A1; U.S. patent publication number US-2007-0255630-A1; U.S. patent publication number US-2007-0261077-A1; and U.S. patent publication number US-2007-0244751-A1/

Upon determination of how to adjust media file play (i.e., the currently male-preference content should be replaced by female-preference content based on the current condition of the audience), processor 250 will generate instructions for adjusting media file play (e.g., replace the media file for men's shaving cream with a file for a recently released movie). Processor 250 will then retrieve a corresponding or specifically identified media file from content database 260 and provide the media file, along with the generated instructions, for subsequent play on the media player 110.

For example, for audience 120A, audience monitoring module 270 may determine that there is only one audience member looking at media player 110, that the audience member is female, under the age of 13 years, smiling, laughing and saying "I love it," and looking at a puppy displayed on media player 110. Audience monitoring module 270 may search content database 260 and then retrieve one or more media files that includes content that is geared toward women and girls, appropriate for young girls (e.g., with respect to language, violence, substance abuse, and other mature content), and that includes content about or related to puppies. The media file may be adjusted to focus on displaying the content about puppies. Alternatively, the media file being played may enlarge the display of the puppy, make the puppy display more dynamic, or skip to other content about or related to puppies (e.g., puppy toys and games).

Alternatively, the audience monitoring module 270 may utilize the data from sensor 220 to determine that audience 120B includes two adult audience members, one of which is male and the other female. As such, the audience monitoring module 270 may indicate that it is appropriate for processor 250 to retrieve and provide for the display of video content from the content database 260 that is geared towards adults and that may appeal to both males and females. If audience monitoring module 270 detects audio responses from either audience member that includes yawning, sighing, or snoring, execution of audience monitoring module 270 by processor 250 may generate an indication that more dynamic content should be displayed on media player 110.

The audience monitoring module 270 may be provided with any number of algorithms, metrics, or other measurement tools to determine what content should be played when and under what conditions. Audience monitoring module 270 may consider not only traffic density and flow but popularity of content, the last time content was played, temporal factors such as time of day, locale, responsiveness to the content (i.e., did traffic flow increase or slow in response to display of the content), and so on. Audience monitoring module 270 is reconfigurable or modifiable in response to the continued development of measurement techniques and/or the availability of particular content in database 260.

Processor 250 may be configured to execute audience monitoring module 270 in memory 240 such that it may analyze received information from sensor 220 as it concerns various traffic conditions. Processor 250 is further configured to select and/or adjust a media file for play on media player 110 based on the detected audience conditions and certain measurements and analyses undertaken by audience monitoring module 270. As discussed above, such detected audience conditions may include gender, age, line-of-sight, and so forth.

Figure 3:
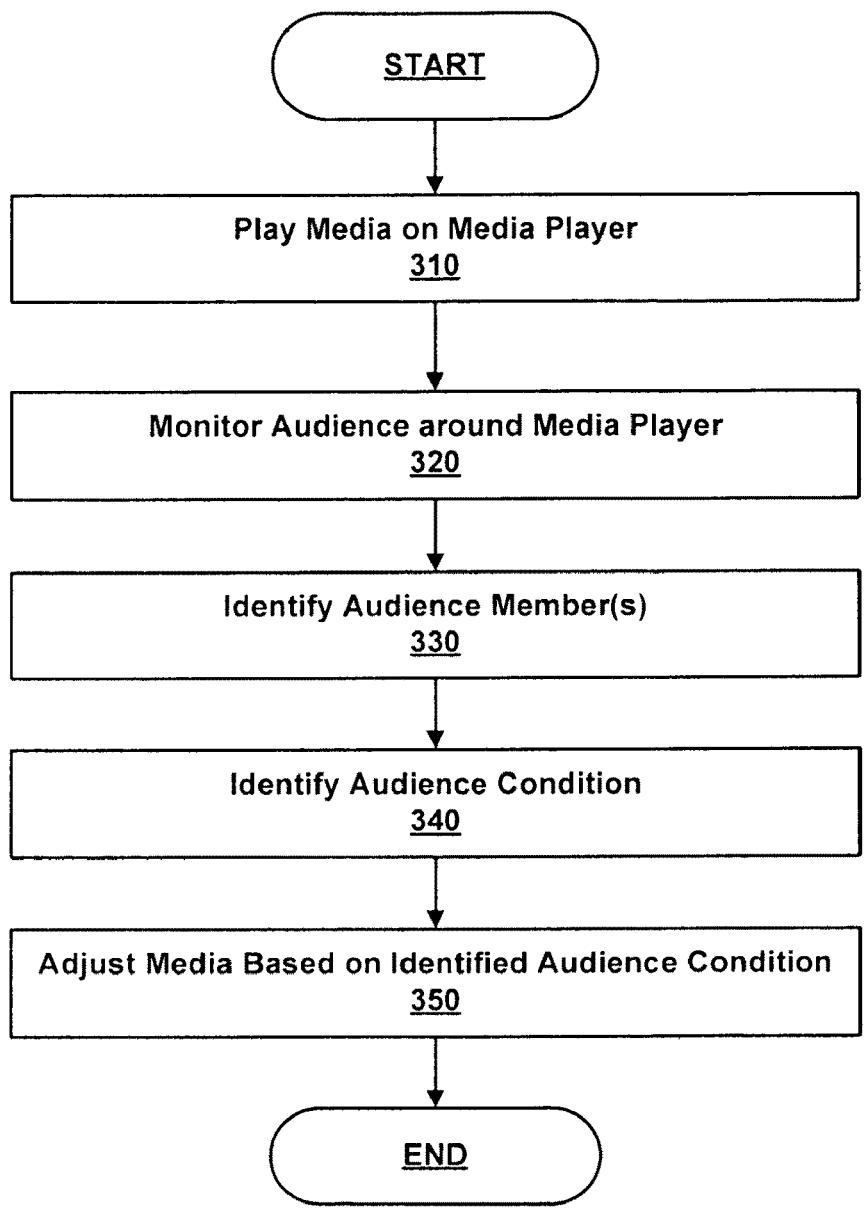
FIG. 3 is a flowchart illustrating an exemplary method for audience-condition based media selection.

FIG. 3 is a flowchart illustrating an exemplary method 300 for traffic-based media selection. In the method 300, a media file may be selected and played on the media player 110, while an area around the media player 110 may be monitored by sensor 220 for the presence and various characteristics of any audience members. Such monitoring may result in detection of an audience member having a line-of-sight directed at the media player 110 as determined by the execution of the audience monitoring module 270 by processor 250 in response to information generated by sensor 220. Further information concerning the audience member may be determined. Based on the information concerning the audience member, media file play on media player 110 may be adjusted.

In step 310, a first media file is selected and played on media player 110. A default media file or playlist of media files may be provided to and played by media player 110. The media files may include any combination of text, graphic, video, and/or audio files.

In step 320, an audience around the media player 110 is monitored by one or more sensors 220. Depending on various user or location specifications, sensors 220 may monitor multiple characteristics or conditions of an audience, including size of the audience, gender, age groups, and so forth. The sensors 220 may also be spaced in various configuration and locations so as to monitor audience conditions in a certain area around the media player 110.

In step 330, an audience having line-of-sight to the media player 110 (e.g., audience 120A or 120B) is detected as a result of processor 250 executing audience monitoring module 270, which utilizes the monitoring information generated by sensors 220. Facial recognition techniques may be used to determine whether an audience member is directing his/her line-of-sight at the media player 110 and therefore actually looking at the media player 110. Information concerning the audience may be provided periodically, automatically, and/or when certain traffic conditions are detected.

In step 340, various audience conditions may be identified from the audience member(s) detected in step 330. In some embodiments, the information concerning the detected audience conditions may be provided by sensors 220 to audience monitoring module 270 residing in memory 240. Audience monitoring module 270 may determine how many audience members have a line-of-sight to media player 110, the gender of such audience members, their ages, their facial expressions, their audio responses, and where on media player 110 they are looking, for example. Further, audience monitoring module 270 may store such identified audience conditions in association with the media file(s) played in memory 240.

In step 350, media file play on media player 110 is adjusted based on the identified audience conditions. Adjustment may include finding content in the media file being played on media player 110 or in a media file in content database 260 that is geared toward the particular conditions of the identified audience members. Gearing toward certain conditions may mean adjusting content to be more gender-specific, age-appropriate, and/or more or less dynamic. Adjustment of media file play may include focusing on certain content, repeating certain content, finding related content, adjusting size of certain portions of displays, adjusting volume of audio, adding sound, etc.

In some embodiments, the media file may be primarily visual (i.e., text, graphics, video), and adjustment may include playing a second media file, which may be an audio file, in conjunction. The second media file may be selected for play in combination with the first media file in certain situations. For example, a user may wish for audio to be added to a visual display when a certain audience condition (e.g., size) is detected. When audience size is low, the media player 110 may display a visual media file without sound. As audience size increases and is detected, a second media file (i.e., an audio file) may be played such that the visual display is accompanied by sound.

Based on the audience information determined by execution of the audience monitoring module 270, processor 250 may also generate a playlist of media files based on the audience information provided.

Computer-readable storage media refer may be utilized to provide instructions to a central processing unit (CPU) for execution, including instructions that correspond to the methodology of FIG. 3. Such media can take many forms, including, but not limited to, non-volatile and volatile media such as optical or magnetic disks and dynamic memory. Common forms of computer-readable media also include a floppy disk, a flexible disk, a hard disk, magnetic tape, other magnetic media, a CD-ROM disk, digital video disk (DVD), other optical medium, RAM, PROM, EPROM, a FLASHEPROM, and other memory chip or cartridges. Various forms of transmission media may be involved in carrying one or more sequences of one or more instructions to a CPU for execution.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive.

Further, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for audience-condition based media selection, the method comprising:
    playing a media file on a media player;
    identifying an audience member from an audience proximate to the media player, the audience member having a line-of-sight with the media player;
    detecting a condition associated with the identified audience member;
    recognizing a plurality of other audience members having a line-of-sight with the media player;
    establishing a count of the plurality of other audience members;
    storing the count in association with the media file being played, wherein the count indicates a popularity of the media file being played; and
    adjusting the media file play based on the condition of the identified audience member.

2. The method of claim 1, further comprising storing information concerning the identified audience member, the stored information associated with the media filed being played.

3. The method of claim 2, wherein the stored information concerning the identified audience member includes a duration of the line-of-sight in association with the media file being played.

4. The method of claim 1, wherein identifying the line-of-sight includes the use of facial recognition.

5. The method of claim 4, wherein detecting the condition further comprises identifying a facial expression, and wherein adjusting the media file play is further based on the identified expression.

6. The method of claim 1, wherein detecting the condition further comprises determining a gender of the audience member, and wherein adjusting the media file play includes playing gender-specific content.

7. The method of claim 6, wherein the gender is identified using facial recognition.

8. The method of claim 6, further comprising storing the gender information in association with the media file being played.

9. The method of claim 1, wherein detecting the condition further comprises determining an age group of the audience member, and wherein adjusting the media file play includes playing age-appropriate content.

10. The method of claim 9, wherein the age group is identified using facial recognition.

11. The method of claim 9, further comprising storing the age information in association with the media file being played.

12. The method of claim 1, wherein detecting the condition further comprises identifying a location on the media player to which the line-of-sight is directed, and wherein adjusting the media file play includes playing dynamic content at the identified location.

13. The method of claim 1, wherein adjusting the media file play includes adjusting an audio component of the media file play.

14. The method of claim 1, wherein the audience is in a virtual environment.

15. The method of claim 1, wherein detecting the condition further comprises detecting an audio response from the audience member, and wherein adjusting the media file play is further based on the audio response.

16. The method of claim 15, further comprising determining content of the audio response using voice recognition, and wherein adjusting the media file play is further based on the determined content.

17. A system for audience-condition based media selection, the system comprising:
a memory configured to:
store a plurality of media files for presentation on a media player, and
an audience monitoring module;
a sensor configured to:
monitor an audience proximate the media player,
detect lines-of-sight with audience members to the media player, and
identify lines of sight for a plurality of audience members; and
a processor configured to:
determine a condition of an audience member with a line-of-sight as detected by a sensor,
generate instructions for adjustment of media file presentation based on the condition, the instruction generated in response to execution of the audience monitoring module,
establish a count of the identified lines-of-sight of the plurality of audience members,
supply the count to memory for storage in association with the media file being played, and
provide the instructions to the media player, the instructions resulting in an adjustment to the media presented on the media player.

18. The system of claim 17, wherein the sensor is further configured to use facial recognition to identify a gender of an audience member.

19. The system of claim 17, wherein the sensor is further configured to use facial recognition to identify an age group of an audience member.

20. The system of claim 17, wherein the memory is further configured to store information concerning the audience member in association with the media file being played.

21. A non-transitory computer-readable storage medium having embodied thereon a program, the program being executable by a computer processor to perform a method for audience-condition based media selection, the method comprising:
playing a media file on a media player;
identifying an audience member from an audience proximate to the media player, the audience member having a line-of-sight with the media player;
detecting a condition associated with the identified audience member;
recognizing lines-of-sight to a plurality of audience members;
establishing a count of the identified lines-of-sight for the plurality of audience members; and
providing the count to a memory in association with the media file being played; and
adjusting the media file play based on the condition of the identified audience member.

22. A method for audience-condition based media selection, the method comprising:
playing a media file on a media player embedded in a virtual environment, the media file being viewable by a virtual audience;
detecting information regarding a member of the virtual audience, wherein the information detected includes line of sight with the media player;
ascertaining information regarding a plurality of other virtual audience members, wherein the information ascertained includes lines of sight with the media player;
establishing a count of the plurality of other virtual audience members;
storing the count in association with the media file being played, the count indicating a popularity of the media file being played;
analyzing the detected information to determine a condition associated with the virtual audience member; and
adjusting the media file play based on the determined condition of the identified audience member.

23. The method of claim 22, wherein detecting the information regarding the virtual audience member includes receiving feedback from the virtual audience member, the feedback received in response to the playing of the media file.

24. The method of claim 22, wherein detecting the information regarding the virtual audience member includes monitoring one or more activities in which the virtual audience member is engaged within the virtual environment.

25. The method of claim 22, wherein the information regarding the virtual audience member further includes information regarding the virtual environment in which the media player is embedded.

26. The method of claim 22, further comprising maintaining information regarding each media file viewed by the virtual audience member and a response by the virtual audience member to each viewed media file.

27. The method of claim 26, wherein the maintained information further includes the determined condition associated with the virtual audience member.

28. The method of claim 26, wherein adjusting media file play is further based on the maintained information.

29. The method of claim 28, wherein adjusting media file play for other virtual audience members is based on the maintained information.

30. A non-transitory computer-readable storage medium having embodied thereon a program, the program being executable by a computer processor to perform a method for audience-condition based media selection, the method comprising:

playing a media file on a media player embedded in a virtual environment, the media file being viewable by a virtual audience;

detecting information regarding a member of the virtual audience, wherein the information detected includes line of sight with the media player;

ascertaining information regarding a plurality of members of the virtual audience, wherein the information ascertained includes lines of sight with the media player;

establishing a count of the ascertained members of the virtual audience;

providing the count to the storage medium in association with the media file being played;

analyzing the detected information to determine a condition associated with the virtual audience member; and adjusting the media file play based on the determined condition of the identified audience member.

31. The non-transitory computer-readable storage medium of claim 21, wherein the method further comprises using facial recognition in recognizing lines-of-sight to a plurality of audience members.

32. The non-transitory computer-readable storage medium of claim 21, wherein the method further comprises identifying an audience member from an audience in a virtual environment.

\* \* \* \* \*

UNITED STATES PATENT AND TRADEMARK OFFICE
CERTIFICATE OF CORRECTION

PATENT NO. : 8,290,604 B2  
APPLICATION NO. : 12/291199  
DATED : October 16, 2012  
INVENTOR(S) : Oliver R. Capio Page 1 of 1

It is certified that error appears in the above-identified patent and that said Letters Patent is hereby corrected as shown below:

On the title page, item (73)  
Assignee's name should be: "Sony Computer Entertainment Inc., Tokyo (JP)"

Signed and Sealed this  
Nineteenth Day of February, 2013

Teresa Stanek Rea  
*Acting Director of the United States Patent and Trademark Office*